United States Patent Office 3,392,113
Patented July 9, 1968

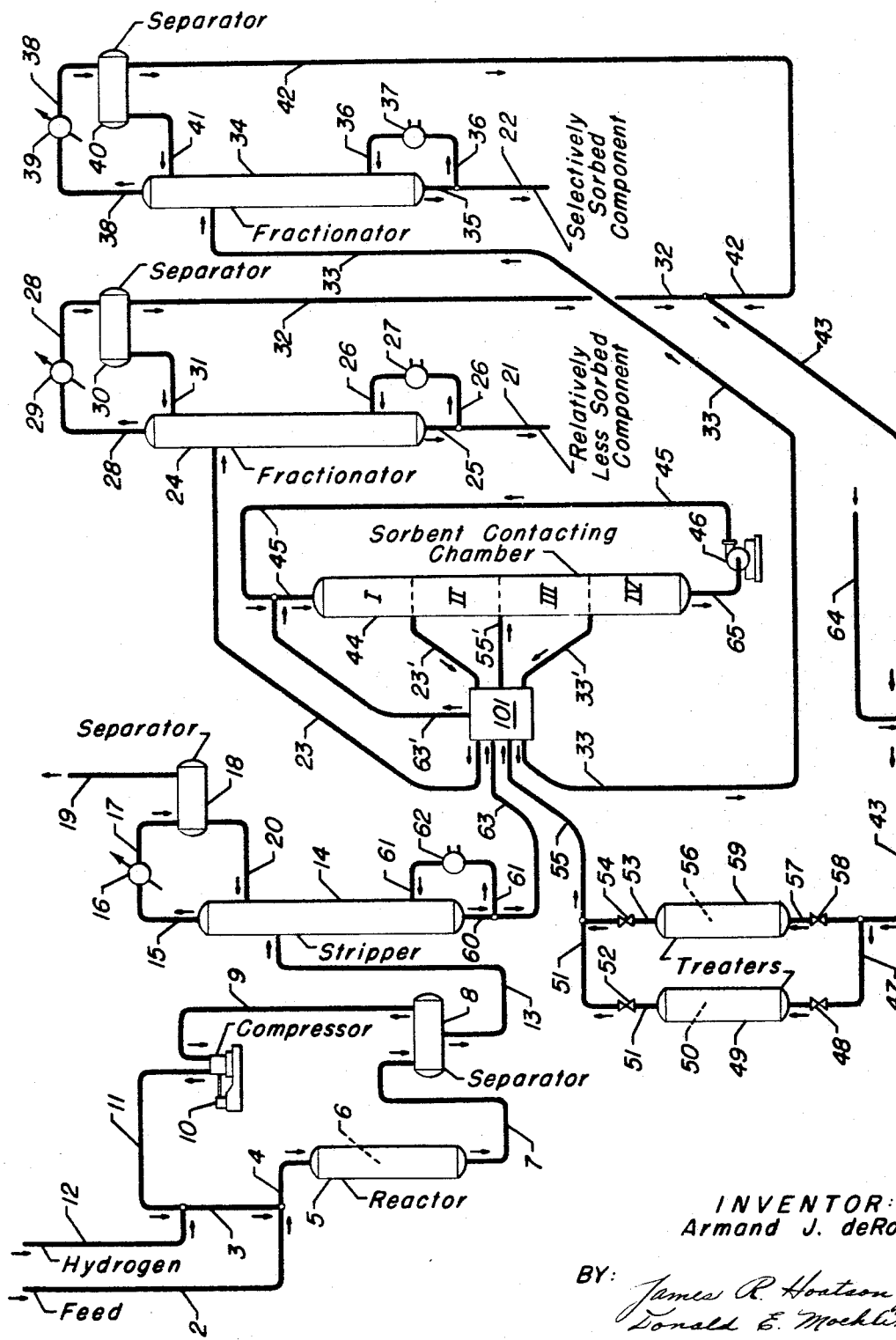

3,392,113
SORPTION PROCESS WITH REMOVING IMPURITIES FROM THE DESORBENT
Armand J. De Rosset, Clarendon Hills, Ill., assignor to Universal Oil Products Company, Des Plaines, Ill., a corporation of Delaware
Filed Feb. 16, 1965, Ser. No. 433,070
13 Claims. (Cl. 208—310)

ABSTRACT OF THE DISCLOSURE

In a cyclic process for the separation of a feed mixture of fluid compounds by contacting the feed with a solid sorbent, such as molecular sieves, selective for at least one compound of said feed mixture, and thereafter passing a fluid desorbent into contact with the sorbent to displace the resulting selectively sorbed compound, said desorbent ordinarily containing trace quantities of aromatic and/or oxygenate impurities which undesirably alter the kinetics, or rates of sorption and desorption of the aforesaid process, over a number of sorption-desorption cycles, the method of stabilizing the kinetics by contacting the desorbent with a separate bed of solid sorbent, prior to utilizing the desorbent in the desorption step, to remove said impurities.

---

This invention relates to a process for the separation of components of a fluid mixture by contacting the mixture with a sorbent selective for at least one component of said mixture and displacing the sorbed component from the sorbent by contacting the sorbent containing the sorbed component with a fluid desorbent. More particularly, this invention relates to the treating of the desorbent by contact with a second sorbent to stabilize the rates of sorpton and desorption of the selectively sorbed component in the first mentioned sorbent.

In one of its embodiments, this invention relates to a process for the separation of components of a fluid mixture, at least one of which is selectively sorbed by contact with a solid first sorbent which is capable of having its sorbency restored by displacing selectively sorbed component with a desorbent which process comprises introducing said fluid mixture into contact with a bed of solid first sorbent; withdrawing from said bed a raffinate comprising relatively less sorbent component and a first portion of the desorbent; separating said raffinate into a stream comprising the relatively less sorbed component and a stream comprising the first portion of the desorbent; withdrawing from said bed a sorbate comprising selectively sorbed component and another portion of the desorbent; separating said sorbate into a stream comprising the selectively sorbed component and a stream comprising the second portion of the desorbent; combining the first portion of the desorbent and the second portion of the desorbent; treating the combined desorbent by contacting it with a solid bed of a second sorbent; and introducing the treated combined desorbent into contact with said bed of solid first sorbent.

In another of its embodiments this invention relates to a process for the separation of components of a fluid mixture, at least one of which is selectively sorbed by contact with a first solid sorbent which is capable of having its sorbency restored by displacing selectively sorbed component with a desorbent said process comprising introducing said fluid mixture into a first zone of a fixed bed of first solid sorbent containing at least 4 serially interconnected zones having fluid flow connecting means between the outlet of one terminal zone and the inlet of the other terminal zone in the series; substantially simultaneously withdrawing a raffinate comprising relatively less sorbed component and a first portion of the desorbent from a second zone immediately downstream from said first zone; separating said raffinate into a stream comprising the relatively less sorbed component and a stream comprising said first portion of the desorbent; introducing a desorbent comprising said first portion of the desorbent and a second portion of the desorbent into a third zone immediately downstream of said second zone; substantially simultaneously withdrawing a sorbate comprising selectively sorbed component and the second portion of the desorbent from a fourth zone immediately downstream from said third zone; separating said sorbate into a stream comprising the selectively sorbed component and a stream comprising said second portion of the desorbent; maintaining a continuously circulating stream of fluid flowing through said series of interconnected zones; periodically advancing downstream the point in said fixed bed of introducing said fluid mixture while simultaneously and equally advancing downstream the point of introducing desorbent and withdrawing raffinate and sorbate and combining said first portion of the desorbent and the second portion of the desorbent and introducing at least a portion of the combined desorbent through a bed of second sorbent prior to introducing the combined desorbent into said third zone of the fixed bed of first sorbent.

Sorption processes to separate components of fluid mixtures are well known in the prior art. Some of these processes utilize sorbents involving surface adsorption believed to be caused by electrostatic forces to separate components from a fluid mixture. For example, activated carbon, silica gel or the like can be utilized to separate aromatics from more saturated hydrocarbon mixtures. Other of these utilize zeolites or as they are more commonly called, molecular sieves, as sorbents to separate components on the basis of their molecular size. Thus, molecular sieves having a pore entrance diameter of about 5 Angstrom units are utilized to separate normal aliphatic hydrocarbons from iso-paraffins, naphthenes, aromatics or the like. The molecular sieves are composed of metal aluminosilicates ideally arranged such that the pore cavities are interconnected by pore entrances of a given uniform size. The pore entrance sizes may be varied by utilization of a different metal within the sieve such as sodium, potassium and calcium or by variation in the silica to alumina ratio. Although molecular sieves may be produced having pore entrance diameters of from about 3 Angstrom units to about 15 Angstrom units, generally it is desirable to utilize a sieve of uniform pore entrance size such that the selectively sorbed component is of a molecular cross sectional size to pass through the pore entrance while the non-sorbed component has a somewhat larger molecular cross sectional size which prevents its passage through the pore entrance.

In a continuous process for the sorption of and desorption of the selectively sorbed component, it is important that the kinetics or rates of sorption and desorption remain relatively constant. Thus, in the sorption process disclosed and claimed in U.S. Patent No. 2,985,589 the kinetics must remain stable in order to continuously recover the selectively sorbed component in high yield and high purity. In this process in which 5 A. molecular sieves are employed as the sorbent, 10 to 15 carbon atoms per molecule ($C_{10}$ to $C_{15}$) normal paraffins are the selectively sorbed component and $C_4$ to $C_8$ normal paraffins are the desorbing agent in the desorbent, the kinetics of the sorption and desorption will be stable if the feed stock containing the $C_{10}$ to $C_{15}$ paraffins is hydrorefined and if the desorbent is in a pure state, that is prepared from chemically pure source. Thus if a normal $C_7$-iso $C_8$ desorbent mixture is synthetically prepared from the substantially pure components by blending and processed in said patented process, high yield and high purity $C_{10}$–$C_{15}$ normal paraffins will be continuously produced as the sorbate product. I have further found that the presence of aromatics in the feed stock even concentrations as high as 20 wt. percent of the feed has little or no effect on the kinetic stability of sorption and desorption. However, I have unexpectedly found that if the desorbent is not prepared from substantially chemically pure components and used in said patented process the kinetics of sorption and desorption are unstable and the sorbate product will contain $C_{10}$–$C_{15}$ normal paraffins in low yield and low purity. In a commercial sorption process in which several thousand barrels of desorbent are required, it is too expensive to prepare the desorbent from substantially chemically pure sources. The desorbent generally contains normal paraffins and iso paraffins and to obtain chemically pure normal paraffins and chemically pure iso paraffins and then to blend them to the desired concentration would result in a substantial increase in the economics of a sorption process. I have found that when the desorbent normal paraffins are produced by molecular sieve extraction, the desorbent iso paraffins are produced from commercially available sources such as alkylate from an hydrofluoric acid or sulfuric acid alkylation unit, the normals and isos blended to the desired concentration and the blended mixture hydrorefined, the kinetics of sorption and desorption are still unstable.

It is an object of this invention to disclose an improvement in the foregoing patented process.

It is another object of this invention to stabilize the kinetics of sorption and desorption when separating normal paraffins from hydrocarbon mixtures using molecular sieves as sorbents.

It is a more specific object of this invention to treat the desorbent in a sorption process employing a molecular sieve sorbent by contacting the desorbent with a second sorbent prior to utilizing the desorbent to displace the normal paraffin from the molecular sieve.

It is another more specific object of this invention to remove trace materials from a desorbent by treating the desorbent with a sorbent, said materials causing instability in the kinetics of sorption and desorption of normal paraffins into and out of molecular sieves.

The accompanying figure is a preferable mode for carrying out the treating step on the desorbent in relation to the overall sorption process. The feed stock to the sorption process is introduced into flow conduit 2 where it mixes with recycle gas and make-up hydrogen flowing in flow conduit 3 and the resulting mixture flows through flow conduit 4 and into reactor 5 containing hydrorefining catalyst 6. Typical operating conditions are pressures of from 200 to 1000 p.s.i.g., temperatures of from 500 to 850° F., liquid hourly space velocities of from 1 to 10, recycle gas rates of 2000–10,000 s.c.f./bbl. (Standard cubic feet gas per barrel of oil), oven a catalyst such as cobalt, molybdenum, and nickel on a silica-alumina support. The reactor effluent is withdrawn through flow conduit 7 and into separator 8. Normally gaseous effluent is withdrawn from separator 8 through flow conduit 9 where it flows to the suction side of recycle compressor 10, through said compressor, through flow conduit 11 where it mixes with make-up hydrogen. The resulting gaseous mixture then flows through flow conduit 3 as described hereinbefore.

The normally liquid effluent is withdrawn from separator 8 through flow conduit 13 where it flows into stripper 14. The purpose of the stripper is to remove light hydrocarbons formed in reactor 5, and to remove water, and other contaminants such as $H_2S$, $NH_3$, etc. from the hydrorefined liquid feed. A gaseous fraction is withdrawn overhead from stripper 14 through flow conduit 15, through cooler 16, through flow conduit 17 and into overhead receiver 18. The normally gaseous material is removed from the system through flow conduit 19 while normally liquid material is returned to fractionator 14 through flow conduit 20 as reflux. A liquid fraction is withdrawn from the bottom of the stripper through flow conduit 60 where a portion thereof flows through flow conduit 61, heater 62 and returns back to stripper 14. The remaining portion flows through flow conduit 63 and comprises the stripped hydrorefined feed to the sorbent contacting chamber.

Although the sorbent contacting chamber may be a movable bed of sorbent, or a fixed bed using the swing bed principle to achieve continuous introduction of feed, it is preferable to use a sorbent contacting chamber like chamber 44 shown diagrammatically in the figure. Chamber 44 is capable of having introduced to it continuously a feed mixture and a desorbing fluid while simultaneously having withdrawn a raffinate comprising the relatively less sorbed component of the feed and a sorbate comprising the selectively sorbed component of the feed. Sorbent contacting chamber 44 represents any suitable apparatus comprising a series of fixed beds or, if desired, one single continuous bed of sorbent having fluid flow connecting means between the outlet of one bed and the inlet of its next adjacent bed and including suitable means, such as a valve or manifold, for shifting the points of inlet and outlet for the various feed and product streams involved in the process. A particularly suitable contacting apparatus is described in U.S. Patent No. 2,985,589. The series of fixed beds of sorbent may be a number (at least 4) of horizontally spaced, separate beds interconnected by a flow conduit between the bottom of one bed and the top of its adjacent bed or the beds may be stacked one upon another within a suitable vertical column as illustrated in the figure, an essential portion of the sorption process, essential that is, to the realization of simulated countercurrent flow of solid and liquid, is the provision of a suitable programming device for changing the points of inlet and outlet into and from the contacting chamber, for advancing each of these points in a downstream direction during the operation of this part of the process. Any suitable form of fluid distribution center such as a manifold arrangement of valves and incoming and outgoing lines may be provided with timed, electrically operated switches to open and close appropriate valves. The programming principle may also be suitably effected by means of a plug valve of particular design such as that rotary valve described and claimed in U.S. Patent No. 3,040,777. Valve 101 in the figure represents such a rotary valve. A continuous stream of fluid is circulated through the fixed beds in chamber 44 by withdrawing fluid from one end of chamber 44 through flow conduit 65, pump 46 and returning said fluid to the other end of chamber 44 by means of flow conduit 45.

The sorbent contacting chamber may also be visualized as being a series of four interconnected zones of a single fixed bed of solid sorbent having no actual line of demarcation between each of the zones other than the zone boundaries defined by the points of inlet and withdrawal for the various fluid streams. In any case, all the zones are defined from the points of inlet and withdrawal. The sorption zone I shown in the figure is defined as the zone bounded between the feed stock inlet and the raffinate outlet; the primary rectification zone II is defined as the zone bounded between the raffinate outlet and the desorbent inlet; the desorption zone III is defined as the zone bounded between the desorbent inlet and the sorbate outlet; and the secondary rectification zone IV is defined as the zone bounded between the sorbate outlet and the feed stock inlet.

The sorbent contacting chamber is operated at conditions of temperature, pressure and under other process conditions which depend upon the particular feed stock involved, the particular sorbent utilized and the required purity of product. Although the chamber may be operated either in the liquid or vapor phase, I prefer liquid phase. Typical liquid phase operation is, for example temperatures of from about 30° F. to about 600° F. and preferably from 250° F. to 500° F. and pressures of from slightly superatmospheric to 30 atmospheres or higher depending primarily upon the feed stock. Generally higher pressures will be employed for lower molecular weight feed stocks to maintain liquid phase in the contacting chamber.

In the process shown in the figure the desorbent is a lower molecular weight material than the feed stock, although the process is equally operable if the desorbent has a higher molecular weight than the feed stock. It is preferable that the desorbent be of sufficiently different molecular weight than the feed as to render it easily separatable by ordinary fractionation. The hydrorefined stripped feed in flow conduit 63 flows through rotary valve 101, through flow conduit 63' and into the upstream point of sorption zone I within chamber 44. Raffinate comprising relatively less sorbed component and a portion of the desorbent is withdrawn from the upstream point of primary rectification zone II within chamber 44 through flow conduit 23' where it flows through rotary valve 101, through flow conduit 23 and into raffinate fractionator 24. A vapor lower molecular weight desorbent fraction is withdrawn overhead from fractionator 24 through flow conduit 28, condenser 29, whereupon it flows into overhead separator 30. A portion of the liquid desorbent is returned to fractionator 24 by means of flow conduit 31 as reflux, while the remainder is withdrawn through flow conduit 32. A liquid higher molecular weight relatively less sorbed component is withdrawn from fractionator 24 through flow conduit 25 where a portion thereof flows through flow conduit 26, heater 27 and returns to fractionator 24. The remaining portion of the relatively less sorbed component is withdrawn from the system through flow conduit 21.

Sorbate comprising selectively sorbed component and another portion of the desorbent is withdrawn from the upstream point of secondary rectification zone IV within chamber 44 through flow conduit 33' where it flows through rotary valve 101, through flow conduit 33 and into sorbate fractionator 34. A vapor lower molecular weight desorbent fraction is withdrawn overhead from fractionator 34 through flow conduit 38, condenser 39 whereupon it flows into overhead separator 40. A portion of the liquid desorbent is returned to fractionator 34 by means of flow conduit 41 as reflux, while the remainder is withdrawn through flow conduit 42. A liquid higher molecular weight selectively sorbed component is withdrawn from fractionator 34 through flow conduit 35 where a portion flows through flow conduit 36, heater 37 and returns to fractionator 34. The remaining portion of the selectively sorbed component is withdrawn from the system through flow conduit 22.

The desorbent flowing in flow conduit 32 is combined with the desorbent flowing in flow conduit 42 to create the total desorbent material flowing in flow conduit 43. Periodically additional desorbent may be added to the system to make-up for small losses of desorbent that may have occurred due to misoperation, leaks, etc. The combined desorbent is treated by contact with a second sorbent to remove what are believed to be trace quantities of impurities such as aromatics and oxygenates from the desorbent and thereby render the kinetics of sorption and desorption in chamber 44 stable. This treating step is the heart of this invention. When these impurities are present in the feed although presumably of higher molecular weight, they have little if any effect on the stability of the kinetics or sorption and desorption. It appears that these impurities are harmful only when present in the desorbent and furthermore, hydrorefining of the desorbent is not sufficient treatment to stabilize the kinetics. There are many variations of arrangement of apparatus suitable for effectively treating the desorbent besides the preferable arrangement shown in the figure. For example a single bed of second sorbent could be utilized and periodically the single bed would be bypassed either to regenerate the second sorbent or to replace it with a fresh batch of second sorbent. Another alternative arrangement would be to locate the bed of second sorbent in flow conduit 64 such that all make-up desorbent that enters the system is subjected to the treating step. However, I prefer to continuously treat the desorbent with a fixed bed of second sorbent operated on a swing bed principle in order to always have the desorbent contacting a fresh bed of active second sorbent. As shown in the figure, the combined desorbent flowing in flow conduit 43 is treated in vessel 49 containing a second sorbent 50 by passing through flow conduit 47, valve 48 and into one end of vessel 49. The treated desorbent is withdrawn from the other end of vessel 49 where it flows through flow conduit 51, valve 52, flow conduit 55, rotary valve 101, and flow conduit 55' whereupon it enters vessel 44 at the upstream point of desorption zone III. Vessel 59 containing additional second sorbent 56 is maintained on standby service until the sorbent in vessel 49 becomes inactivated. Thereafter the combined desorbent will be routed through vessel 59 by opening valves 54 and 58 while closing valves 48 and 52 which will result in the combined desorbent passing through flow conduit 43, flow conduit 57, valve 58, vessel 59, flow conduit 53, valve 54 and into flow conduit 55 whence it flows as hereinbefore described. The second sorbent in vessel 49 may be regenerated by contacting it with a polar solvent such as an alcohol and heating the second sorbent to a temperature of about 200° F. or it may be simply thrown away and replaced with a fresh batch of second sorbent. It is estimated that in many cases the second sorbent will retain its activity for effectively treating the desorbent for many months in which case it may not be necessary to regenerate said second sorbent.

Although a wide variety of second sorbents may be used to treat the desorbent, I prefer those sorbents selected from the group consisting of alumina, silica-alumina, silica, molecular sieve, silica gel and activated carbon. The treating chambers are operated at temperatures of from about ambient to about 600° F., and at pressures sufficiently high to maintain the desorbent in the liquid phase. However the temperatures should be maintained low enough to prevent any cracking when using sorbents having an appreciable degree of acid activity. Liquid hourly space velocities of from about 0.1 to 50 are suitable although are preferably maintained from about 0.5 to about 10.

Auxiliary equipment necessary for the proper functioning of the equipment shown in the figure such as pumps, heat exchangers, heaters, control valves, means for actuating control valves, etc. have been omitted in the interest of simplicity and brevity. However, it is to be understood that this auxiliary equipment is necessary for the process to function although its selection is within the ordinary skill of a process and instrument engineer. It should also be understood that the positions of flow conduits 63', 23', 55', and 33' will be shifted as rotary valve 101 rotates so as to achieve simulated countercurrent flow of solid and liquid phase.

The following examples are included to further demonstrate the novelty, usefulness and unobviousness of the present invention, but it is not intended to limit the invention to the fluid components or the sorbents illustrated therein.

EXAMPLE I

A feed mixture of 16% n-tetradecane in isooctane is introduced into one end of a fixed bed thereby contacting a 40 cc. bed of commercially available 5 A. molecular sieves at 300 p.s.i.g., 450° and 3 LHSV. When the molecular sieve cavities are full of n-tetradecane, as evidenced by gas-liquid chromatography (GLC) analysis of the effluent from the other end of the fixed bed, a desorbent containing 50% chemically pure n-octane in chemically pure isooctane is introduced into the one end of the fixed bed at the above conditions to effect the displacement of n-tetradecane within the sieve cavities by n-octane. This is continued until the effluent contains no n-tetradecane by GLC analysis. Said feed is thereupon re-introduced into said one end again until the effluent contains no n-octane. The steepness of the concentration gradient of appearance of n-tetradecane in the effluent is observed and taken as a measure of the rate of sorption of n-tetradecane. Specifically during the latter n-tetradecane displacing of n-octane step it was found that 18.7 cc. of feed is required to be introduced into said one end in order for the concentration of n-tetradecane in the effluent to go from 1.6% to 14.4% (these concentrations being the 10% point and the 90% point of the concentration of n-tetradecane in the feed). The volume of feed required to change the effluent from 10% to 90% of n-tetradecane can be taken as a measure of the rate of sorption of n-tetradecane and the higher the volume the slower the rate of sorption. The above test of measuring the volume of feed for the changing from the 10% point to the 90% point hereinafter referred to as the breakthrough slope was repeated for 5 additional sorption-desorption cycles and it is observed that the slope is constant therefore indicating a kinetically stable sorption-desorption process.

EXAMPLE II

An identical run to that of Example I is made except a desorbent containing 16% chemically pure n-decane in isooctane is used as the desorbent. During 5 sorption-desorption cycles the value of the n-tetradecane breakthrough slope is constant at 12.0 cc. This value shows that although the kinetics of the sorption process is somewhat different when n-decane is used as a desorbent instead of n-octane; nevertheless the kinetics of the sorption-desorption process is stable. The above two examples further illustrate that the desorbent normal paraffin and the desorbent diluent (isooctane) are free of materials which could affect the normal paraffin exchange kinetics over a period of time.

EXAMPLE III

A run identical to that of Example II is made except a commercial hydrorefined hydrofluoric acid alkylate (a material rich in isoparaffins) is substituted for isooctane in the feed and desorbent. The n-tetradecane breakthrough slope in the first cycle is 16.6 cc. and in subsequent cycles increases rapidly and at the ninth cycle is 45.6 cc. The results of this run illustrates that the alkylate used as a desorbent diluent gives unstable kinetics of sorption and desorption when compared to chemically pure isooctane.

EXAMPLE IV

The feed and desorbent of Example III are used again in an identical run except that before being introduced into one end of the 40 cc. bed, they are passed through a second fixed bed containing 5 A. molecular sieves at 450° F., 300 p.s.i.g. and 3 LHSV. The breakthrough slope of n-tetradecane is constant at 13.4 cc. over 8 cycles. This example illustrates that the pretreatment over the second bed of sieves upgraded the desorbent made with commercial alkylate diluent from one giving unstable sorption kinetics to one which is equivalent to the chemically pure n-decane-isooctane desorbent and resulting in stable sorption kinetics.

EXAMPLE V

A run identical to that of Example III is made except that a commercial sulfuric acid alkylate (rich in isoparaffins) is used as a desorbent diluent. The breakthrough slope of n-tetradecane is again unstable, changing from 13.8 cc. to 21 cc. over 9 cycles. This example illustrates that the use of the sulfuric acid alkylate as a desorbent diluent results in unstable sorption kinetics.

EXAMPLE VI

A feed stock and a desorbent identical to that in Example I except that sulfuric acid alkylate is substituted for isooctane are prepared and used in a run similar to that of Example IV in that a second bed of 5 A. sieves used as a pretreater is employed. The feed and desorbent are passed through the second bed at 450° F., 300 p.s.i.g. and 3 LHSV prior to being introduced into said one end of the 40 cc. bed. The n-tetradecane breakthrough slope is stable at 21 cc. for 10 cycles. The stability of this example is similar to that of Example I and demonstrates that sulfuric acid alkylate diluent desorbent is upgraded from one giving unstable sorption kinetics to one as stable as the chemically pure desorbent.

EXAMPLE VII

The feed of Example I and the desorbent of Example VI are used in another run employing the same procedure as in Example I. As expected, kinetically unstable sorption process results as indicated by the fact that the breakthrough slope of n-tetradecane increases from 20 to 28 cc. during 20 cycles. At this point the desorbent is passed through a second bed of silica gel at 77° F., 300 p.s.i.g. and 1 LHSV prior to being introduced into the 40 cc. bed. The breakthrough slope of n-tetradecane is immediately stabilized out at 26.5 cc. for an additional period of 5 cycles. This example illustrates that the undesirable effect of the sulfuric acid alkylate on sorption kinetics is arrested by the treatment of the desorbent with a second bed of silica gel as a pre-treatment step.

EXAMPLE VIII

A run identical to that of Example VII is made except activated alumina is employed as the sorbent in the second bed. The results indicate that stable kinetic sorption is achieved similar to that in Example VII.

EXAMPLE IX

A run identical to that of Example VIII is made except cracking catalyst containing a 75/25 ratio of silica to alumina is employed as the sorbent in the second bed. Again, stable kinetics of sorption are demonstrated.

EXAMPLE X

Equipment is arranged substantially as shown in the accompanying figure except for the omission of treaters 49 and 59. A kerosene fraction having an initial Engler boiling point of about 380° F. and an end point of about 495° F. is introduced into flow conduit 2. Reactor 6 is operated at a pressure of 900 p.s.i.g., a maximum catalyst temperature of 700° F., a recycle gas rate of 2500 s.c.f./bbl. of feed, and a LHSV of 5.0 and employs a catalyst having cobalt, molybdenum and nickel metal on a silica-alumina support. The normally liquid stripped product flowing in flow conduit 63 has the following physical properties: Initial boiling point 386° F., end point 500° F., aromatics content 12.4 volume percent, normal paraffin content 17.7 wt. percent and carbon number range $C_{10}$ to $C_{15}$. A desorbent is prepared by blending 75 volume percent chemically pure normal heptane and 25 volume percent chemically pure isooctane and is thereupon introduced into the system through flow conduit 64. The process in the figure is operated as described hereinbefore with chamber 44 containing 11.2 gallons of sieves at the following conditions: temperature 450° F., pressure 350 p.s.i.g., feed rate 2.93 gal./hr., desorbent rate 5.30 gal./hr. After lining the plant out and operating until 12.9 gallons of feed have passed over 1 pound of sieves, the sorbate flowing through flow conduit 22 contains 97.2% of the total normals in the feed in flow conduit 63 and has a concentration of 98.3% normal paraffins. These latter two members represent the yield and purity respectively of the normal paraffins in the feed.

EXAMPLE XI

Another run as in Example X having treater 49 and 59 present but bypassed is made except that the desorbent is prepared by blending normal octane (prepared from a naphtha by a separate molecular sieve extraction step) and a $C_8$ fraction from sulfuric acid alkylate in concentrations of 75% normal $C_8$ and 25% iso $C_8$. The alkylate was obtained from a sulfuric acid alkylation unit where it was subsequently hydrorefined over a catalyst containing cobalt, molybdenum and nickel metal on a silica-alumina support at 3.0 LHSV, 800 p.s.i.g., 650° F. peak temperature and a recycle gas rate of 5000 s.c.f./bbl., and fractionated to produce a $C_8$ fraction having an initial boiling point of 210° F. and an end point of 240° F. before blending with the normal octane. The resulting synthetic desorbent is introduced into the process through flow conduit 64 and the process in the figure is lined out at essentially the same operating conditions as described in Example X. The sorbate flowing through flow conduit 22 contains 85.4% of the total normals in the feed and has a concentration of 98.3% normal paraffins. Thus by using a non-pure component desorbent the yield of normal paraffins in the sorbate is decreased by 11.8% while the purity of normal paraffins in the sorbate is maintained at 98.3 wt. percent.

EXAMPLE XII

Another run is made identical to that in Example XI except that treater 49 containing 5 A. molecular sieves is connected to contact the desorbent as shown in the figure. The sieves in treater 49 are maintained at 450° F., 350 p.s.i.g. and is of such a volume that the LHSV is 2.0. The process is lined out at essentially the same operating conditions as described in Example XI using the same sieves in chamber 44 that were used in Example XI. The sorbate flowing through flow conduit 22 contains 91.2% of the total normals in the feed and has a concentration of 98.3% normal paraffins. Thus the presence of a desorbent treater has revived the activity of the sieves in chamber 44 as evidenced by an increase in the yield of normal paraffins in the sorbate by 5.8% while maintaining the normal purity of the sorbate product at 98.3 wt. percent.

I claim as my invention:

1. In a process for separating the components of a mixture of fluid hydrocarbons, in which at least one of which is selectively sorbed by contact with a 5 A. molecular sieve sorbent and at least one other component is relatively less sorbed by the sorbent, said process comprising the steps: introducing feed stock containing said mixture of components into one zone of a fixed bed of said molecular sieve sorbent containing at least 4 serially interconnected zones having fluid flow connecting means between adjacent zones and between the outlet of the last zone and the inlet of the first zone in the series, introducing a hydrocarbon desorbent capable of displacing the selectively sorbed component from said sorbent into another zone of the fixed bed of sorbent which is downstream relative to the zone into which said feed stock is charged, substantially simultaneously withdrawing a raffinate mixture comprising relatively less sorbed component and said desorbent from an intermediate zone of said fixed bed, between the zones into which said feed is charged and the zone into which said desorbent is charged, substantially simultaneously withdrawing a sorbate mixture comprising selectively sorbed component and said desorbent from a zone which is downstream with respect to the zone into which the desorbent is charged, maintaining a continuously circulating stream of fluid flowing through said series of interconnected zones, periodically advancing downstream the point of charging said feed stock while simultaneously and equally advancing the point of charging desorbent and withdrawing sorbate and raffinate, recovering a first desorbent portion from said raffinate mixture and recovering a second desorbent portion from said sorbate mixture, combining said first and second desorbent portions and returning the combined desorbent to the fixed bed of sorbent, the method of stabilizing the rates of sorption and desorption of the aforesaid process which comprises contacting said first and second desorbent portions with a second solid sorbent, prior to introducing said combined desorbent into the fixed bed of first mentioned sorbent, to remove from the desorbent organic impurities which otherwise cause said sorption-desorption rates to change with time.

2. The process of claim 1 further characterized in that the second sorbent is selected from the group consisting of alumina, silica-alumina, silica, molecular sieve, silica gel and activated carbon.

3. A process for the separation of components of a fluid hydrocarbon mixture, at least one of which is selectively sorbed by contact with a 5 A. molecular sieve sorbent which is capable of having its sorbency restored by displacing selectively sorbed component with a hydrocarbon desorbent which process comprises:

introducing said fluid mixture into contact with a bed of molecular sieve sorbent;

withdrawing from said bed a raffinate comprising relatively less sorbed component and a first portion of the desorbent;

separating said raffinate into a stream comprising the relatively less sorbed component and a stream comprising the first portion of the desorbent;

withdrawing from said bed a sorbate comprising selectively sorbed component and another portion of the desorbent;

separating said sorbate into a stream comprising the selectively sorbed component and a stream comprising the second portion of the desorbent;

combining the first portion of the desorbent and the second portion of the desorbent;

treating the combined desorbent by contacting it with a solid bed of a second sorbent to remove from the desorbent organic impurities which otherwise cause the rates of sorption and desorption of the aforesaid process to change with time;

and introducing the treated combined desorbent into contact with said bed of solid first sorbent.

4. The process of claim 3 further characterized in that the second sorbent is selected from the group consisting of alumina, silica-alumina, silica, molecular sieve, silica gel and activated carbon.

5. The process of claim 4 further characterized in that the selectively sorbed component is a normal aliphatic hydrocarbon.

6. The process of claim 5 further characterized in that the normal aliphatic hydrocarbon is a paraffin.

7. A process for the separation of components of a fluid hydrocarbon mixture, at least one of which is selectively sorbed by contact with a 5 A. molecular sieve sorbent which is capable of having its sorbency restored by displacing selectively sorbed component with a hydrocarbon desorbent said process comprising:

introducing said fluid mixture into a first zone of a fixed bed of 5 A. molecular sieve sorbent containing at least 4 serially interconnected zones having fluid flow connecting means between the outlet of one terminal zone and the inlet of the other terminal zone in the series;

substantially simultaneously withdrawing a raffinate comprising relatively less sorbed component and a first portion of the desorbent from a second zone immediately downstream from said first zone;

separating said raffinate into a stream comprising the relatively less sorbed component and a stream comprising said first portion of the desorbent;

introducing a desorbent comprising said first portion of the desorbent and a second portion of the desorbent into a third zone immediately downstream of said second zone;

substantially simultaneously withdrawing a sorbate comprising selectively sorbed component and the second portion of the desorbent from a fourth zone immediately downstream from said third zone;

separating said sorbate into a stream comprising the selectively sorbed component and a stream comprising said second portion of the desorbent;

maintaining a continuously circulating stream of fluid flowing through said series of interconnected zones;

periodically advancing downstream the point in said fixed bed of introducing said fluid mixture while simultaneously and equally advancing downstream the point of introducing desorbent and withdrawing raffinate and sorbate;

and combining said first portion of the desorbent and the second portion of the desorbent and introducing at least a portion of the combined desorbent through a bed of second sorbent, prior to introducing the combined desorbent into said third zone of the fixed bed of said molecular sieve sorbent to remove from the desorbent organic impurities which otherwise cause the rates of sorption and desorption of the aforesaid process to change with time.

8. The process of claim 7 further characterized in that the selectively sorbed component comprises a normal paraffin hydrocarbon, and the second sorbent is selected from the group consisting of alumina, silica-alumina, silica, molecular sieve, silica gel and activated carbon.

9. The process of claim 8 further characterized in that the bed of second sorbent comprises molecular sieves maintained at a temperature of from ambient to about 600° F.

10. In a process for the separation of normal paraffins from a hydrocarbon mixture which comprises introducing said mixture into a fixed bed of molecular sieves whose pore entrance diameter is about 5 Angstrom units, introducing a hydrocarbon desorbent into the fixed bed to displace the normal paraffins of the mixture out of the pores of the molecular sieves, withdrawing a raffinate comprising non-normal components of the mixture and a first portion of desorbent from the bed, separating the raffinate into a stream comprising said non-normal components and a stream comprising said first portion of desorbent, withdrawing a sorbate comprising said normal paraffins and a second portion of desorbent from the bed, separating the sorbate into a stream comprising said normal paraffins and a stream comprising said second portion of desorbent, combining the first portion and the second portion of desorbent and recycling the combined desorbent back to the bed of molecular sieves, the method of stabilizing the rates of sorption and desorption of the aforesaid process which comprises treating the desorbent by introducing the combined desorbent into a fixed bed of sorbent to remove from the desorbent organic impurities which otherwise cause said sorption-desorption rates to change with time, and thereupon recycling the treated desorbent back to the bed of molecular sieves.

11. The process of claim 10 further characterized in that the sorbent is selected from the group consisting of alumina, silica-alumina, silica, molecular sieve, silica gel and activated carbon and the treating step is carried out at temperatures of from ambient to about 600° F., liquid hourly space velocities of from 0.5 to 10 and at pressures sufficiently high to maintain the combined desorbent substantially in the liquid phase.

12. A process for the separation of components of a fluid hydrocarbon mixture, at least one of which is selectively sorbed by contact with a 5 A. molecular sieve sorbent which is capable of having its sorbency restored by displacing selectively sorbed component with a hydrocarbon desorbent treated as hereinafter defined, which process comprises:

introducing said fluid mixture into contact with a bed of 5 A. molecular sieve sorbent;

withdrawing from said bed a raffinate comprising relatively less sorbed component and a first portion of the desorbent;

separating said raffinate into a stream comprising the relatively less sorbed component and a stream comprising the first portion of the desorbent;

withdrawing from said bed a sorbate comprising selectively sorbed component and a second portion of the desorbent;

separating said sorbate into a stream comprising the selectively sorbed component and a stream comprising the second portion of the desorbent;

treating said first and second desorbent portions by contacting such portions with a second solid sorbent to remove from the desorbent organic impurities which otherwise cause the rates of sorption and desorption of the aforesaid process to change with time;

and introducing the thus treated first and second desorbent portions as a combined stream into contact with said bed of molecular sieve sorbent.

13. The process of claim 12 further characterized in that said second sorbent is selected from the group consisting of alumina, silica-alumina, silica, molecular sieve, silica gel and activated carbon.

References Cited

UNITED STATES PATENTS

| | | | |
|---|---|---|---|
| 3,030,431 | 4/1962 | Mattox et al. | 260—676 |
| 3,094,569 | 6/1963 | Thomas | 260—676 |
| 2,819,326 | 1/1958 | Mills | 208—310 |
| 2,854,495 | 9/1958 | Fear | 208—310 |
| 2,985,589 | 5/1961 | Broughton et al. | 208—310 |
| 3,291,726 | 12/1966 | Broughton | 208—310 |
| 3,306,848 | 2/1967 | Wackher et al. | 208—310 |

DELBERT E. GANTZ, *Primary Examiner.*

H. LEVINE, *Assistant Examiner.*